United States Patent
Whitner et al.

(10) Patent No.: US 10,110,419 B2
(45) Date of Patent: Oct. 23, 2018

(54) ALARM TO EVENT TRACING

(71) Applicant: CA, Inc., New York, NY (US)

(72) Inventors: Richard Bennett Whitner, Fort Collins, CO (US); James Andrew Perkins, Fort Collins, CO (US)

(73) Assignee: CA, Inc., New York, NY (US)

( * ) Notice: Subject to any disclaimer, the term of this patent is extended or adjusted under 35 U.S.C. 154(b) by 272 days.

(21) Appl. No.: 14/973,468

(22) Filed: Dec. 17, 2015

(65) Prior Publication Data
US 2017/0180187 A1  Jun. 22, 2017

(51) Int. Cl.
*H04L 12/24* (2006.01)
*H04L 12/26* (2006.01)

(52) U.S. Cl.
CPC .......... *H04L 41/0631* (2013.01); *H04L 43/10* (2013.01)

(58) Field of Classification Search
CPC .............................. H04L 41/0631; H04L 43/10
See application file for complete search history.

(56) References Cited

U.S. PATENT DOCUMENTS

| | | | |
|---|---|---|---|
| 6,446,136 B1 * | 9/2002 | Pohlmann | G06F 11/3006 707/999.104 |
| 8,060,782 B2 * | 11/2011 | Caspi | G06F 11/0709 714/26 |
| 8,463,899 B2 * | 6/2013 | Scarpelli | G06F 11/0709 709/224 |
| 9,344,465 B2 * | 5/2016 | Stern | H04L 29/0899 |
| 9,417,949 B1 * | 8/2016 | Bray | G06F 11/0751 |
| 2003/0167406 A1 * | 9/2003 | Beavers | G06F 11/0709 726/22 |
| 2012/0166869 A1 * | 6/2012 | Young | G06F 11/008 714/15 |
| 2016/0334770 A1 * | 11/2016 | Laycock | G05B 19/048 |

OTHER PUBLICATIONS

Crowell, "Event Correlation and Root Cause", CA, Inc. White Paper, http://genesiscom.biz/de/2/products/downloads/event_correlation_and_root_cause_analysis.pdf as visited Dec. 17, 2015, Mar. 2004, 15 pages.

* cited by examiner

*Primary Examiner* — Michael C Lai
(74) *Attorney, Agent, or Firm* — Gilliam IP PLLC

(57) ABSTRACT

An alarm might not have information helpful to resolve the alarm to its contributing events. Thousands of events can occur in a system in a relatively short period of time, and any number of those events can contribute to various alarms. Tracing contributing events to an alarm can provide some helpful insight or at least efficiently provide a starting point for resolving or investigating an alarm. A system can determine, maintain, and persist associations at least among events, rule instances, and alarms to allow alarm-to-contributory event tracing.

20 Claims, 7 Drawing Sheets

ALARM TO EVENT TRACING

BACKGROUND

The disclosure generally relates to the field of computer systems, and more particularly to event management systems.

Events are generated by a variety of sources or components, including hardware and software. Events include messages that can indicate numerous activities, such as an application finishing a task or a server failure. An event management system collects and processes events generated by components. For example, an event management system may distribute events to network monitoring applications, assign events to an administrator, filter and consolidate events, etc. The event management system may also generate alarms based on processing received events.

BRIEF DESCRIPTION OF THE DRAWINGS

Embodiments of the disclosure may be better understood by referencing the accompanying drawings.

DESCRIPTION

Figure 1:
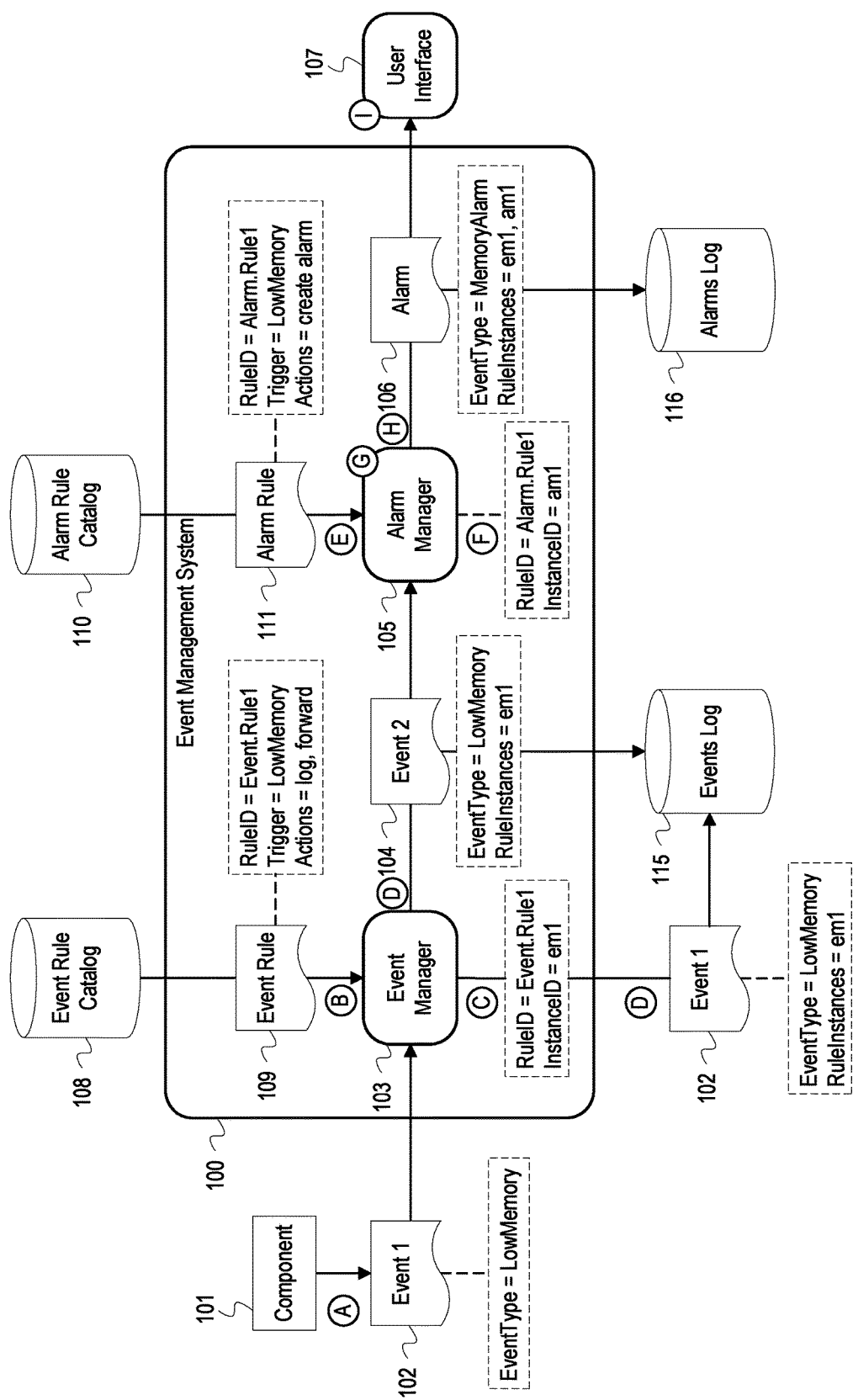
FIG. 1 depicts an example event management system including an event manager and an alarm manager that trace rules and events which contribute to an alarm by tagging events with instance identifiers.

The description that follows includes example systems, methods, techniques, and program flows that embody aspects of the disclosure. However, it is understood that this disclosure may be practiced without these specific details. For instance, this disclosure refers to events generated by components of a network in illustrative examples. But aspects of this disclosure can be applied to events generated by components within a local system, such as components of a storage device. In other instances, well-known instruction instances, protocols, structures and techniques have not been shown in detail in order not to obfuscate the description.

Terminology

An indication of an event (e.g., event message or event notification) is commonly reduced to "event." Accordingly, this disclosure refers to an event in the disclosure, but the claims refer to an event indication. An event is an occurrence in a system or in a component of the system at a point in time. An event often relates to resource consumption and/or state of a system or system component. As examples, an event may be that a file was added to a file system, that a number of users of an application exceeds a threshold number of users, or that an amount of available memory falls below a memory amount threshold. An indication of an event can reference or include information about the event and is communicated to a component/agent/process that processes event indications. Example information about an event includes an event type/code, application identifier, time of the event, severity level, event identifier, event description, etc.

The disclosure also uses the term "alarm" to refer to a notification of an event, of a system or component state related to the event or a set of events, of a cumulative effect of a series of events, etc. In some cases, the information in an event indication and in an alarm can be the same information. But the event indication is more likely in a form for consumption by a process/agent and the alarm is likely in a form for consumption by a user as a warning. An alarm is generated based on a rule applied to one or more events.

Structure, format, and encoding of a rule can vary. In a simple case, a rule comprises a trigger or criterion for application of the rule and a defined action, which can be a conditional action or an unconditional action. A more complex rule can also have a condition to evaluate before performing a defined action ("rule pre-condition"), multiple defined actions, and/or a nested rule. Each application of a rule to an event can be considered instantiating the rule. In some cases, applying a rule to an event involves initialization of state information for the rule and maintenance of state information. The state for the rule, and possibly an associated process(es), is referred to herein as a rule instance. A single event or events can cause multiple instances of one or more rules over time and can cause change in state of one or more of the multiple rule instances.

Overview

An alarm might not have information helpful to resolve the alarm to its contributing events. Thousands of events can occur in a system in a relatively short period of time, and any number of those events can contribute to various alarms. Tracing contributing events to an alarm can provide some helpful insight or at least efficiently provide a starting point for resolving or investigating an alarm. A system can determine, maintain, and persist associations at least among events, rule instances, and alarms to allow alarm-to-contributory event tracing.

Example Illustrations

FIG. 1 is annotated with a series of letters A-I. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

FIG. 1 depicts an example event management system including an event manager and an alarm manager that trace rules and events which contribute to an alarm by tagging events with instance identifiers. FIG. 1 depicts an event management system 100 communicatively coupled to a component 101. Component 101 may be one of a plurality of components (not depicted) that are communicatively coupled to the event management system 100, such as computing systems, routers, switches, storage devices, virtual machines, applications, application components, etc. The event management system 100 includes an event manager 103 and an alarm manager 105. The event management system 100 is also communicatively coupled to an event rule catalog 108, an alarm rule catalog 110, an events log 115, and an alarms log 116. FIG. 1 also depicts a user interface 107.

At stage A, the component 101 generates an event 1 102 and sends the event 1 102 to the event management system 100. The event 1 102 may be generated by an agent or probe on the component 101, a hardware or software module of the component 101, etc. As depicted in FIG. 1, the event 1 102 includes an event type "LowMemory." The event 1 102 may include other information such as an identifier for the component 101, an identifier for an entity associated with the component 101, a timestamp, etc. The component 101 may send the event 1 102 to the event management system 100 through a designated interface or port using a particular communication protocol. For example, the component 101 may send the event 1 102 as a Hypertext Transfer Protocol ("HTTP") message though a port reserved for event communication. The event 1 102 is received by the event manager 103 of the event management system 100.

At stage B, the event manager 103 determines whether the event 1 102 triggers any event rules in the event rule catalog 108. The event manager 103 may query the event rule catalog 108 using the event type of the event 1 102 to determine whether any rules are triggered by the event type. Alternatively, the event manager 103 may first query an event catalog (not depicted) to retrieve additional metadata or other information related to the event 1 102. The event manager 103 may use the metadata or other information to identify parameters or properties of the event 1 102. The event manager 103 may then query the event rule catalog 108 using one of the parameters of the event 1 102 to determine whether the parameter triggers any rules in the event rule catalog 108. In FIG. 1, the event manager 103 determines that an event rule 109 was triggered by the event 1 102 based on the event type "LowMemory." The event rule 109 includes an identifier for the rule (RuleID), a condition for the rule (Trigger), and a list of one or more actions (Actions). The Trigger for the event rule 109 indicates that the Actions are to be performed when an event indicates LowMemory. The Actions indicate how an event should be processed or what commands or functions should be performed based on receipt of the event. The Actions of event rule 109 indicates that the event 1 102 should be logged and forwarded.

At stage C, in response to determining that the event rule 109 was triggered, the event manager 103 creates an instance of the event rule 109 and tags the event 1 102 with an instance identifier for the event rule 109. A rule may persist over time or may be triggered multiple times by different events. As a result, multiple instances of a rule may be maintained and applied to different events or series of events. For example, an event rule may indicate that action should be taken if an event indicating a high processor load for a host occurs five times within a ten minute window. A first high processor load event from a host A may trigger the rule causing a first instance of the rule to be applied to the first event. Then, a second high processor load event from a different host, host B, may trigger the rule causing a second instance of the rule to be applied to the second event. Each rule instance will maintain its own state, e.g., occurrence count within the time window, specific to host A and host B. The two instances of the rule are assigned identifiers so that events may be associated with a particular instance of a rule. When instantiating the event rule 109, the event manager 103 creates an instance identifier (InstanceID) of "em1" to be associated with the instance of the event rule 109. Creating an instance of the event rule 109 indicates that the event rule 109 has been triggered and is being used to process an event or events. The event manager 103 may store the instance of the event rule 109 in memory or local storage of a system executing the event management system 100. Additionally, the event manager 103 may store the instance of the event rule 109 in a log such as the events log 115. The event manager 103 at least stores the instance identifier along with an identifier for the event rule 109. The event manager 103 may also store information related to event rule 109 or state information related to the instance of the event rule 109. For example, if the instance of the event rule 109 is specific to a particular component, the event manager 103 may associate an identifier for the component with the instance identifier in memory or state data. In some instances, the event rule 109 may cause state data, such as an event counter or timer, to be created. The event manager 103 may also associate the created state data with the instance identifier.

After instantiating the event rule 109, the event manager 103 tags the event 1 102 with the instance identifier that was created for the instance of the event rule 109. As depicted in FIG. 1, the event 1 102 was tagged with the instance identifier of "em1." The event 1 102 may be tagged with the instance identifier by adding the instance identifier to metadata of the event 1 102, adding the instance identifier to a field in a data structure for the event 1 102, associating a record in a database of the event 1 102 to a record with the instance identifier of the event rule 109, etc. In some implementations, the event 1 102 may also be tagged with the rule identifier of the event rule 109, i.e. "Event.Rule1."

At stage D, the event manager 103 performs the actions indicated by the event rule 109. As described above, the event rule 109 indicates that the event 1 102 should be logged and forwarded. The event manager 103 logs the event 1 102 which has been tagged with the instance identifier in the events log 115. The events log 115 may be a database or may be persistent storage communicatively coupled to the event management system 100. The event manager 103 stores the event 1 102 so that the event 1 102 may be queried based on the instance identifier for the instance of the event rule 109. For example, if the events log 115 is a relational database management system, a record of the event 1 102 stored in the events log 115 may be modified to indicate that the event 1 102 is related to a record for the instance of the event rule 109. Similarly, the record for the instance of the event rule 109 may be modified to indicate all event records with which the instance is associated.

In accordance with the forwarding action indicated by the event rule 109, the event manager 103 creates an event 2 104 to be forwarded to the alarm manager 105. As depicted in FIG. 1, the event 2 104 is essentially a copy of the event 1 102 after the event 1 102 was tagged with the instance identifier for the event rule 109. In some instances, the event 2 104 may be enhanced with metadata or other information pulled from the event catalog. Additionally, the event 2 104 may be a completely different event type than the event 1 102 or be otherwise modified based on actions indicated by the event rule 109. The event 2 104 may also be logged in the events log 115 as depicted in FIG. 1.

At stage E, the alarm manager 105 determines whether the event 2 104 triggers any alarm rules in the alarm rule catalog 110. The alarm manager 105 determines whether alarm rules are triggered in a manner similar to how the event manager 103 determined whether any event rules were triggered at stage B. For example, the alarm manager 105 may query the alarm rule catalog 110 using the event type of the event 2 104 to determine whether any rules are triggered by the event type. In FIG. 1, an alarm rule 111 was triggered by the event 2 104 based on the event type "LowMemory." The alarm rule 111, similar to the event rule 109, includes an identifier for the rule (RuleID), a condition for the rule (Trigger), and a list of one or more actions (Actions). The alarm rule 111 indicates that an alarm should be created.

At stage F, in response to determining that the alarm rule 111 was triggered, the alarm manager 105 creates an instance of the alarm rule 111. The alarm manager 105 instantiates the alarm rule 111 in a manner similar to how the event manager 103 instantiated the event rule 109. However, the alarm rule 111 does not indicate that the event 2 104 should be logged. As a result, the alarm manager 105 may not tag the event 2 104 with an instance identifier as was done by the event manager 103 prior to logging the event 1 102. Regardless, an instance identifier is generated for the instance of the alarm rule 111 so that events or alarms created as a result of the alarm rule 111 may be tagged with the instance identifier.

At stage G, the alarm manager 105 creates an alarm 106 as indicated by the alarm rule 111. Although described as an "alarm," the alarm 106 includes data similar to an event such as the event 2 104. For example, the alarm 106 includes an event type and a list of rule instances. The alarm 106 may also include other information (not depicted) such as an alarm severity, alarm duration, etc. When creating the alarm 106, the alarm manager 105 includes the list of rule instances indicated by the event 2 104. Additionally, the alarm manager 105 tags the alarm 106 with the instance identifier for the instance of the alarm rule 111 which is appended to the list of rule instances.

At stage H, after creating the alarm 106, the alarm manager 105 logs and forwards the alarm 106. The alarm manager 105 logs the alarm 106 to the alarms log 116. The alarms log 116 may be a database or may be persistent storage communicatively coupled to the event management system 100. The alarm manager 105 may maintain the alarms log 116 to include records of active alarms and a history of previously generated alarms. Although depicted as separate, the alarms log 116 and the events log 115 may be maintained in a single database or other storage device. The alarm manager 105 forwards the alarm 106 to the user interface 107.

At stage I, the user interface 107 displays the alarm 106. The user interface 107 may be part of the event management system 100 or may be part of network management software operating on a computer system or network host. The user interface 107 may display an alarm severity, a description of the alarm 106, etc. Additionally, using the rule instances of the alarm 106, a system operating the user interface 107 may obtain information related to the rules and events that resulted in generation of the alarm 106. For example, the system may be communicatively coupled to the events log 115, the event rule catalog 108, and the alarm rule catalog 110. The system may query the events log 115 using the instance identifiers in the alarm 106 to obtain events related to the rule instances. Additionally, the system may obtain rule identifiers associated with the instance identifiers and use the rule identifiers to query the event rule catalog 108 and the alarm rule catalog 110 to obtain additional information about the rules. The system may obtain rule identifiers associated with the instance identifiers by querying a table in memory or a database where rule instances are stored using the instance identifiers. Alternatively, the system operating the user interface 107 may submit requests for information through an application programming interface of the event management system 100. The request may include the list of instance identifiers included in the alarm 106. The user interface 107 may then display obtained information related to events and rules that caused the alarm 106 to be generated. Additionally, the obtained information may be forwarded to root cause analysis software that may use the information to determine a root cause for an issue indicated by the alarm 106.

The event manager 103 and the alarm manager 105 are software modules of the event management system 100. In some implementations, the event manager 103 and the alarm manager 105, although depicted as separate in FIG. 1, may be realized as a single module which embodies the functionality of both managers. In other implementations, the event management system 100 may not include either the event manager 103 or the alarm manager 105. Although depicted as part of the event management system 100, the event manager 103 and the alarm manager 105 may be distributed across different systems. Additionally, each system may host multiple instances of the event manager 103 and the alarm manager 105. The multiple instances may operate in parallel or act as failovers. An event may be traced back to a particular instance of the event manager 103 or the alarm manager 105 which created the event.

In FIG. 1, the alarm 106 is tagged with the rule instance identifiers received with and triggered by the event 2 104. In some instances, the alarm 106 may be tagged with rule instance identifiers received with and triggered by multiple events. For example, an alarm rule may indicate that an alarm should be created if both a first event and a second event are received. The rule instance list of the created alarm may be a combination of the rule instances received with and triggered by both the first and second event. In some implementations, the rule instance list may only contain a rule instance sufficient to trace back to the first event and the second event, as opposed to all rule instances indicated in the two events. For example, if the first event and the second event were each tagged with a rule instance identifier A, the alarm may be tagged with just the rule instance identifier A. The rule instance identifier A may later be used to trace back to the first event and second event and retrieve additional rule instances associated with those events. By only retaining identifiers sufficient to connect a link in a trace, the number of rule instances in a rule instance list maintained in an event or event log can be reduced.

Figure 2:
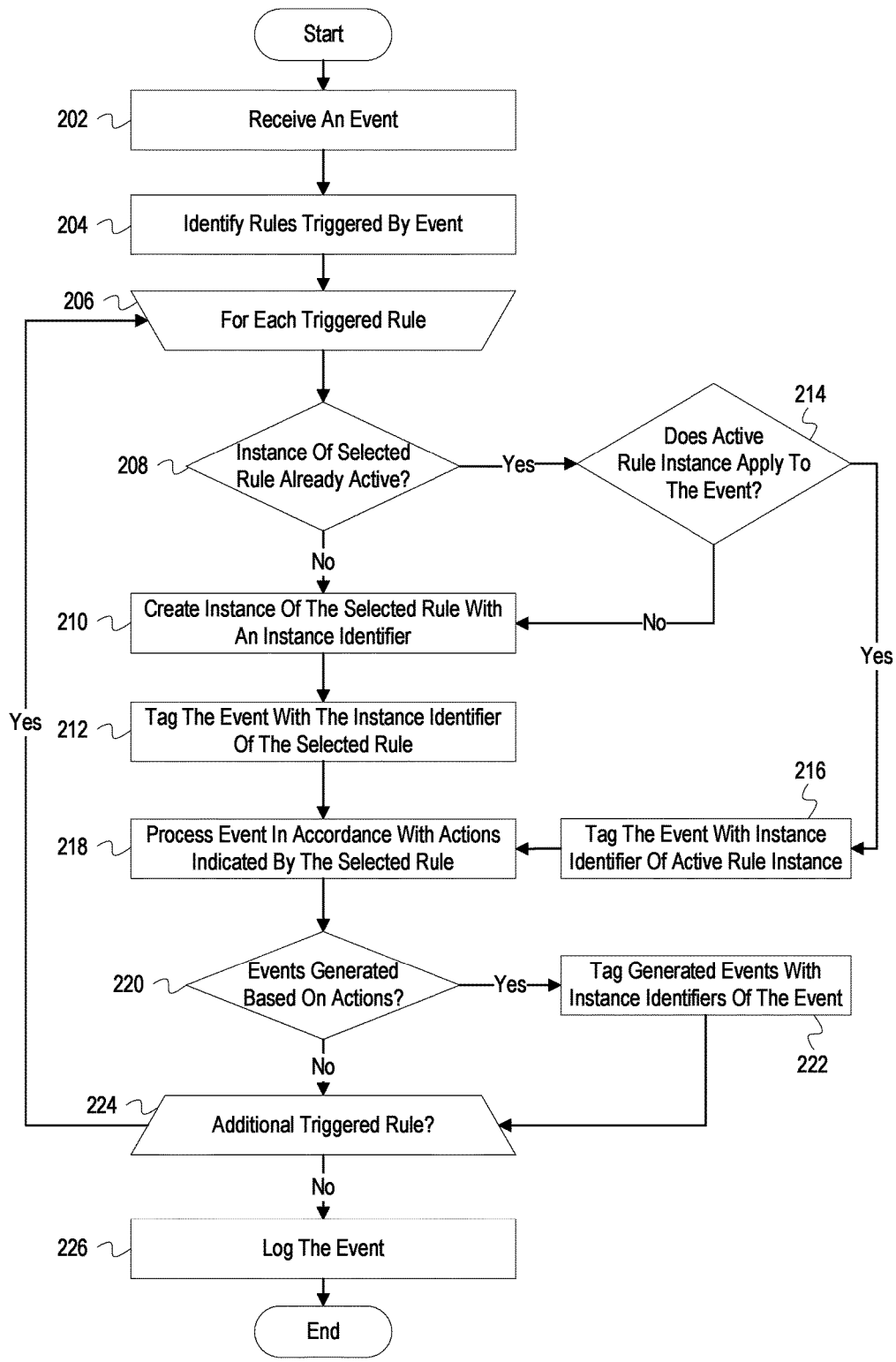
FIG. 2 depicts a flow diagram of example operations for tagging an event with rule instance identifiers.

FIG. 2 depicts a flow diagram of example operations for tagging an event with rule instance identifiers. The operations described in FIG. 2 are described as being performed by an event manager, such as the event manager 103 depicted in FIG. 1. The operations may also be performed by an alarm manager, such as the alarm manager 105 depicted in FIG. 1.

An event manager receives an event from a component (202). The event manager may receive the event directly from the component or may receive the event through an event communication bus. As part of receiving the event, the event manager may also retrieve metadata or other information related to the event from an event catalog. The metadata information can indicate the contents of the event, contain other properties for the event, etc. For example, the event catalog may include an extensible markup language ("XML") file that represents a data structure of the event which allows the event manager to identify parameters of the event.

The event manager identifies rules that were triggered by the event (204). Rules may be triggered by a number of conditions, such as receipt of an event with a certain event type or other parameter. For example, an event may include a parameter that indicates it originated from component A, and a rule may be triggered whenever an event originating from component A is received. Rules may be stored in a rule catalog or database that includes information, such as rule identifiers, triggers, and actions. The event manager may query the rule catalog using an event type or other parameter to identify triggered rules. For example, the event manager may query the rules catalog with an event type of "LowDiskSpace" to identify all rules that include the "LowDiskSpace" event type as a trigger.

The event manager applies each of the triggered rules to the event (206). In some instances, the event manager may not perform operations for each of the triggered rules. A more complex rule can also have a rule pre-condition to evaluate. For example, a rule triggered by the "LowDiskSpace" event type may only be applied to an event if the available disk space indicated by the event is below a threshold. If the available disk space is not below the threshold, then the event manager does not apply the triggered rule to the event. As a result, the event manager does not perform the operations described below for triggered rules that failed to satisfy the rule pre-condition. The rule for which the event manager is currently performing operations is hereinafter referred to as "the selected rule."

The event manager determines whether an instance of the selected rule is already active (208). When applying a rule to an event, the event manager creates and maintains an instance of the rule. A rule instance may remain active during processing of a single event or may persist and affect a number of events. For example, a rule which indicates that events with a "LowMemory" event type should be counted over a period of time may be triggered by receipt of a first "LowMemory" event. An instance of the rule will persist for the period of time and affect subsequent events received with a "LowMemory" event type by counting them. In some instances, rules may be active until all alarms with which a rule is associated are cleared or resolved. As a result, an instance of the selected rule triggered by the event may already be active. The event manager may search active rule instances with a rule identifier for the selected rule to determine whether the selected rule has any active instances. Rule instances may be stored in memory or persistent storage of an event management system or in a log or database.

After determining that there is at least one active instance of the selected rule, the event manager determines whether any of the active rule instances apply to the event (214). Even though the event triggered the selected rule, an active instance of the selected rule may not apply to the event, i.e. the instance may be associated with another event or series of events. The event manager analyzes the selected rule to identify criteria or properties that control application of the rule. For example, a rule instance may apply to all events, a single event, events with a certain event type, events originating from a specified component, etc. Continuing with the example rule regarding "LowMemory" event types, the rule may be configured to count just "LowMemory" events that originated from the same component. The event manager analyzes the rule and determines that the originating component is a property that affects application of the rule instance. For example, an active instance of the rule may be configured to count "LowMemory" events that originated from a first component. If a "LowMemory" event originates from a second component, the event manager determines based on the originating component property that a second instance of the rule should be created to count "LowMemory" events for the second component. Information relating to the application of the selected rule may be stored as part of the rule instance.

After determining that the active rule instance applies to the event, the event manager tags the event with an instance identifier of the active rule instance (216). Since an active instance of the selected rule applies to the event, the event manager does not create another instance of the selected rule. Instead, the event is tagged with the instance identifier of the active rule instance by adding the instance identifier to the event data. For example, the event may be tagged with the instance identifier by adding the instance identifier to metadata of the event, adding the instance identifier to a field in a data structure of the event, etc. The instance identifier is appended to any other instance identifiers with which the event has already been tagged. The accumulated instance identifiers indicate each of the rules that have affected or been applied to the event. As new events are created based on the event, the accumulated instance identifiers are added to the new events so that events in an event management system can be analyzed to identify rules and events that contributed to the event in its current state.

After determining that there is not an active instance of the selected rule or after determining that the active rule instance does not apply to the event, the event manager creates an instance of the selected rule with an instance identifier (210). Each application of a rule to an event can be considered instantiating the rule. A rule includes a set of actions that specify how the event is to be processed. The event manager may instantiate a rule by taking steps to accomplish the set of actions indicated by the rule. In some cases, the event manager initializes state data for the rule or maintains the state data. For example, if the rule indicates that an event should be counted, the event manager may create a counter associated with the instance identifier in state data. The event manager instantiates a rule by at least creating an instance identifier for the rule and associating the instance identifier with an identifier for the rule. The association of instance identifier to rule identifier may be stored in memory or persistent storage of an event management system or in a log or database. This association allows for tracing from instance identifiers back to rules with which the identifier correspond.

The event manager tags the event with the instance identifier of the selected rule instance (212). The event manager tags the event in a manner similar to that described above at process block 216.

The event manager processes the event in accordance with actions indicated by the selected rule (218). As described above, rules indicate actions that should be performed in response to or on the event. For example, a rule may indicate that another event should be created, an alarm should be created, a script or command should be executed, etc. A rule may also indicate actions that should be performed in response to a condition being satisfied, such as a threshold being reached, a counter equaling a value, etc. As a result, the event manager may evaluate a condition indicated by the selected rule before performing indicated actions. As part of performing the actions, the event manager may also update or maintain state data for an instance of the rule. For example, if a rule action involves a counter, the event manager may increment the counter that was created as part of instantiating the rule. As additional examples, the event manager may update state data by resetting a timer, logging an occurrence of an event, updating a value in state data based on an event property, etc. The event manager updates state data that is associated with the instance of the selected rule, either the active rule instance that was determined to apply to the event at process block 214 or the instance that was created at process block 210.

The event manager determines whether any events were generated based on the processing in accordance with the actions indicated by the selected rule (220). The event manager may determine whether events were generated based on the actions indicated in the selected rule. For example, if a rule action indicates that an event should be created, the event manager may determine that additional events were generated.

If additional events were generated, the event manager tags the generated events with instance identifiers of the event (222). The instance identifiers of the event includes the instance identifier that the event was tagged with either at process block 212 or process block 216. Additionally, the instance identifiers include any instance identifiers with which the event was previously tagged. In this way, the tagged instance identifiers continue to flow through an event management system so that a chain of events and rules may be traced back from an alarm or particular event. Based on the number of the triggered rules have been processed, the generated events may be tagged with just a subset of instance identifiers for the triggered rules in additional to any instance identifiers with which the event was previously tagged. In some instances, the event manager may wait until instance identifiers for each of the triggered rules have been determined and then tag generated events with all instance identifiers and any instance identifiers with which the event was previously tagged. Alternatively, the event manager may tag an event with any instance identifiers with which the event was previously tagged and just the instance identifier for the selected rule determined at process block 212 or process block 216

If additional events were not generated or after generated events were tagged, the event manager determines whether there is an additional rule triggered by the event (224). If there is an additional triggered rule, the event manager selects the next triggered rule (206).

If all rules have been processed, the event manager logs the event (226). The event manager may write the event to a database or persistent storage communicatively coupled with the event management system. After the operations beginning at process block 206, the event will be tagged with an instance identifier for each of the triggered rules. In order to utilize this information, the event manager may store the event so that the event may be queried based on rule instance identifiers. For example, the event may be stored in a database and associated with each rule instance identifier that the event triggered. The database may then be queried with a rule instance identifier to determine all events that were affected by the particular rule instance. After logging the event, the operations end.

FIG. 2 depicts logging the event a single time after the event has been tagged with all rule instance identifiers. In some instances, the event may be logged each time the event is tagged with a rule instance identifier so that each event entry in the log includes a single rule instance identifier. In other instances, the event may not be logged unless indicated by an action of a triggered rule.

Figure 3:
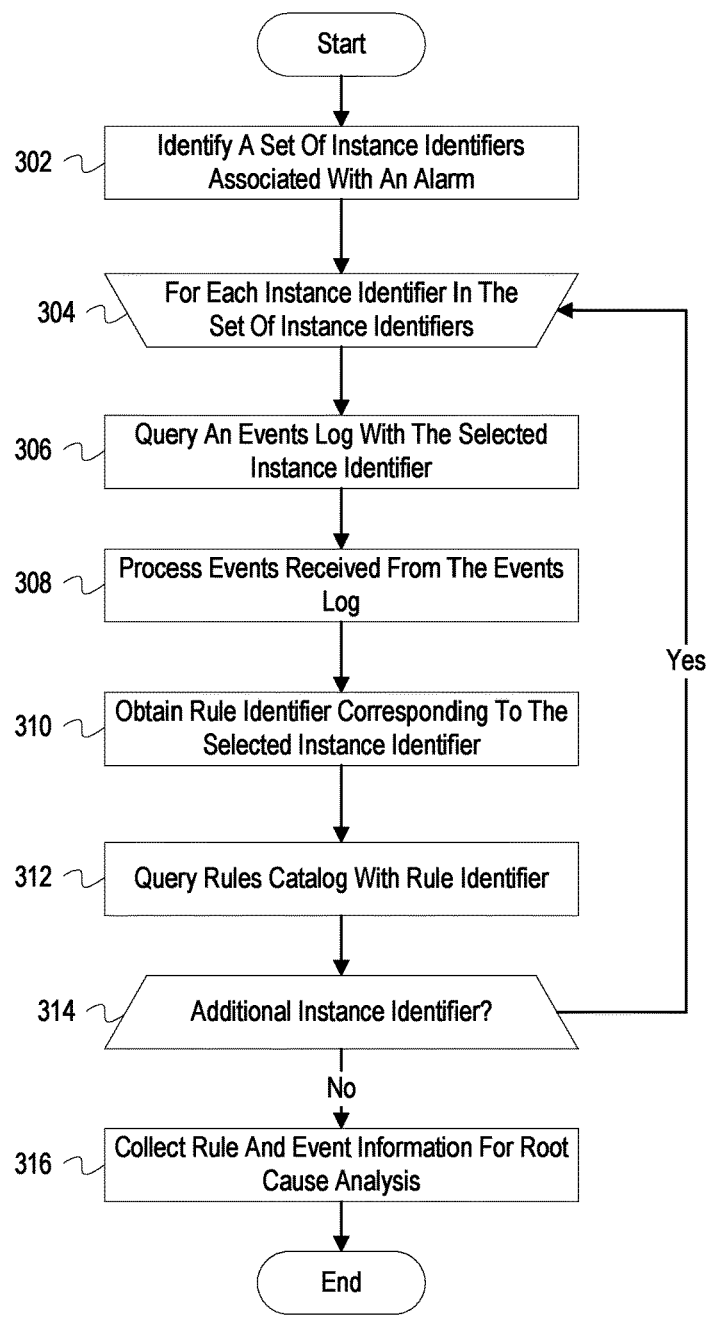
FIG. 3 depicts a flow diagram of example operations for using rule instance identifiers to trace from an alarm to contributory events and rules.

FIG. 3 depicts a flow diagram of example operations for using rule instance identifiers to trace from an alarm to contributory events and rules. The operations described in FIG. 3 are described as being performed by a network manager that may be part of a network management and monitoring system that displays and analyzes alarms. The operations may also be performed by a root cause analysis system that attempts to determine the cause of issues indicated by the alarms.

A network manager identifies a set of instance identifiers associated with an alarm (302). As described above in FIG. 1, an alarm generated by an event management system contains a set of rule instance identifiers which corresponds to rules that contributed to generation of the alarm. The set of rule instance identifiers may be stored in metadata of the alarm or as part of the alarm data structure. The network manager reads the set of instance identifiers from the alarm and may populate an array or other data structure with the set of instance identifiers.

The network manager performs operations for each instance identifier in the set of instance identifiers (304). The instance identifier for which the network manager is currently performing operations is hereinafter referred to as "the selected instance identifier."

The network manager queries an events log with the selected instance identifier (306). The events log may be an events log such as the events log 115 described in FIG. 1. The events log contains events along with instance identifiers for instances of rules that were triggered by the events. In response to a query with the selected instance identifier, the events log returns events that were associated with that rule instance. Some implementations may include multiple events logs, such as one associated with an event manager and one associated with an alarm manager. As a result, the network manager may query multiple data sources with the selected instance identifier.

The network manager processes events received from the events log (308). The network manager may process the received events by populating an array with the events, sorting the events based on corresponding timestamps, organizing the events based on event types or other event properties, etc. Since an event may be associated with multiple instance identifiers, queries of the event log with instance identifiers from the set of instance identifiers may return the same event multiple times. To prevent duplicate instances of the same event, the network manager may also deduplicate the received events against previously received events. Furthermore, the network manager may identify additional rule instance identifiers in the received events by comparing rule instance identifiers associated with the received events to the set of instance identifiers. The network manager may perform additional queries with the additional rule instance identifiers in a manner similar to that described at process block 306. The network manager may then similarly process any additional events received as a result of the queries. Therefore, multiple queries or a chain of queries may be executed in order to retrieve or trace back to all events associated with the selected instance identifier.

The network manager obtains a rule identifier corresponding to the selected instance identifier (310). When a rule is instantiated, an event management system creates an instance identifier and stores the instance identifier along with an identifier for the rule. The event management system may store the identifiers together in state data which may be stored in memory, persistent storage, a database, etc. Using the selected instance identifier, the network manager may obtain the rule identifier from the storage location of the identifiers. For example, the network manager may query a database using the selected instance identifier. In some instances, the event management system may create instance identifiers that include the rule identifier. For example, if a rule identifier is "EventRuleA," the event management system may make the instance identifier "EventRuleA.1." In such an instance, the network manager may obtain the rule identifier by analyzing the selected instance identifier. The network manager may also obtain data related to the rule instance in addition to the rule identifier. An instance identifier may be associated with state data that was created as part of instantiating a rule. For example, the instance identifier may be associated with counter, times, event logs, event properties, etc. The network manager may search state data with the instance identifier to identify associated state data.

The network manager queries a rules catalog with the rule identifier (312). The rules catalog may be a rules catalog such as the event rule catalog 108 or the alarm rule catalog 110 as described in FIG. 1. The rules catalog includes information for rules such as rule identifiers, triggers, and actions. Additionally, the rules catalog may include human readable information such as descriptions and labels for triggers and actions. The network manager may query the rules catalog to obtain information related to the rule corresponding to the rule identifier. For example, the network manager may determine which triggers are associated with the rule or may determine actions associated with the rule and any conditions on those actions.

The network manager determines if there is an additional instance identifier in the set of instance identifiers (314). If there is an additional instance identifier, the network manager selects the next instance identifier (304).

If there is not an additional instance identifier, the network manager collects rule and event information for root cause analysis (316). The network manager may collect all of the events retrieved from the events log and any retrieved rules and transmit the collected data to a root cause analysis system. Additionally, the network manager may collect state data retrieved with the instance identifiers. In some instances, the network manager may perform some processing on the events, rules, and state data prior to sending the collected data to the root cause analysis system. For example, the network manager may isolate events with a particular event type and may isolate rules triggered by the event type. The network manager may send the events and rules associated with the event type for root cause analysis. As an additional example, the network manager may determine temporal relationships among the retrieved events and organize the events according to these relationships.

In the descriptions of FIGS. 1, 2, and 3, an event management system tags events with rule instance identifiers as events flow through and are processed by an event management system. In some embodiments, instead of maintaining a list of rule instance identifiers within data of an event, events may be tagged with a unique identifier as described in FIG. 4 below. The instance identifiers for rules triggered by the events are logged along with the unique identifier for the events. Similarly, events may be logged along with the unique identifier. As a result, a unique identifier that is ultimately associated with an alarm may be used in a query to retrieve all events and rules that led to the creation of the alarm.

Figure 4:
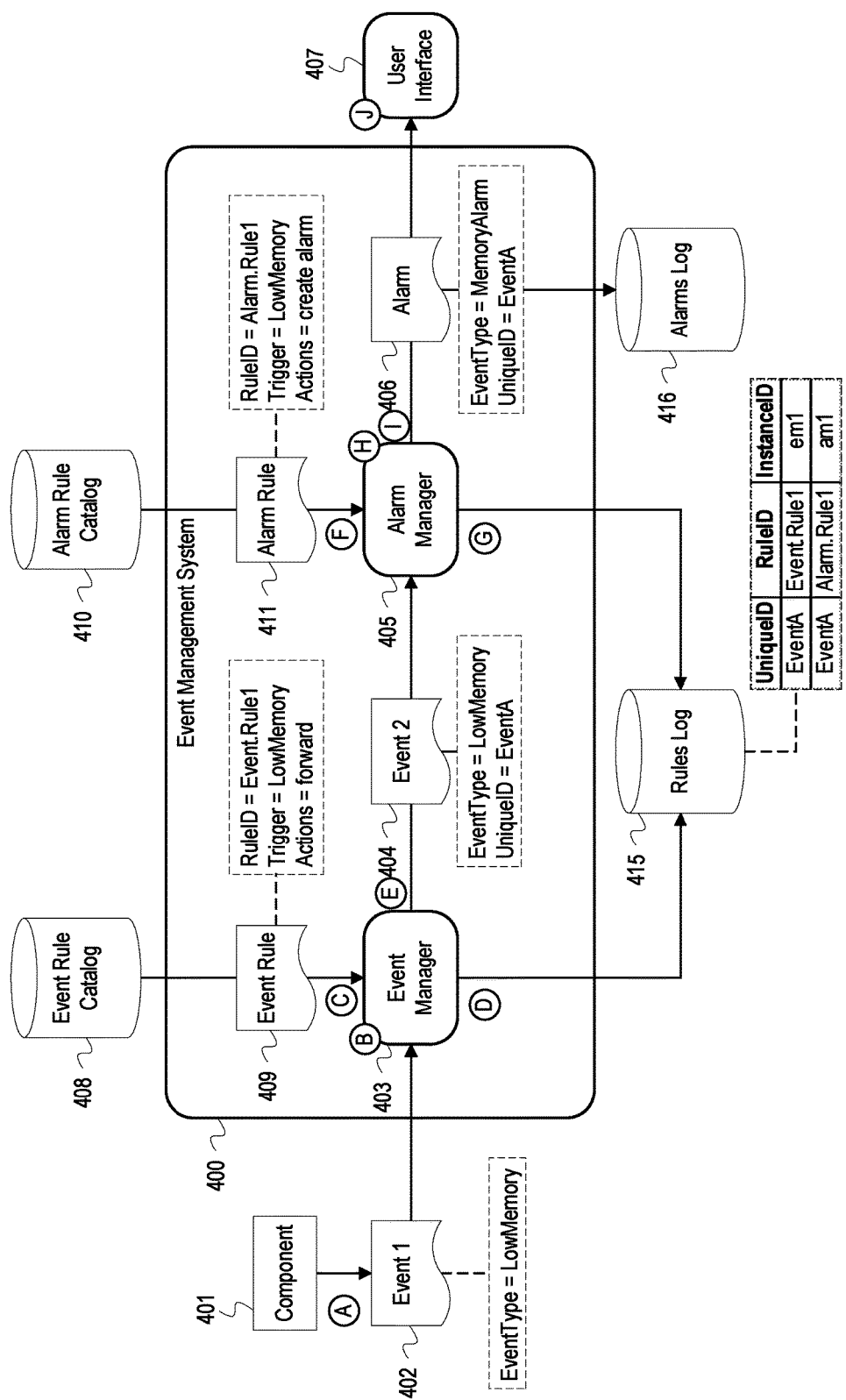
FIG. 4 depicts an example event management system including an event manager and an alarm manager that trace rules and events which contribute to an alarm using unique identifiers.

FIG. 4 is annotated with a series of letters A-J. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

FIG. 4 depicts an example event management system including an event manager and an alarm manager that trace rules and events which contribute to an alarm using unique identifiers. FIG. 4 depicts an event management system 400 communicatively coupled to a component 401. Component 401 may be one of a plurality of components (not depicted) that are communicatively coupled to the event management system 400, such as computing systems, routers, switches, storage devices, virtual machines, applications, application components, etc. The event management system 400 includes an event manager 403 and an alarm manager 405. The event management system 400 is also communicatively coupled to an event rule catalog 408, an alarm rule catalog 410, a rules log 415, and an alarms log 416. FIG. 4 also depicts a user interface 407.

At stage A, the component 401 generates an event 1 402 and sends the event 1 402 to the event management system 400. The component 401 may generate the event 1 402 in a manner similar to that of component 101 as described at stage A of FIG. 1.

At stage B, the event manager 403 creates a unique identifier for the event 1 402. The event manager 403 may request the unique identifier from a module that manages identifiers for the event management system 400, may generate a hash based on data from the event 1 402, may generate an identifier based on a configured namespace, etc. In FIG. 1, the event manager 403 creates the unique identifier "EventA." Although not depicted, the event manager 403 may also tag the event 1 402 with the unique identifier and log the event 1 402 in an event log or database.

At stage C, the event manager 403 determines whether the event 1 402 triggers any event rules in the event rule catalog 408. The event manager 403 determines whether the event 1 402 triggers any event rules in a manner similar to that of the event manager 103 as described at stage B of FIG. 1.

At stage D, in response to determining that the event rule 409 was triggered, the event manager 403 creates an instance of the event rule 409 and stores an instance identifier in the rules log 415 along with the unique identifier. The event manager 403 creates an instance of event rule 409 in a manner similar to that of the event manager 103 as described at stage C of FIG. 1. The event manager 403, however, does not tag the event 1 402 with the instance identifier. Instead, the event manager 403 logs the instance identifier along with the unique identifier determined at Stage B to the rules log 415. The rules log 415 may be a database or may be persistent storage communicatively coupled to the event management system 400. As depicted in FIG. 4, the rules log 415 includes a record of the unique identifier along with the rule identifier of the event rule 409 and the instance identifier ("em1") for the created instance of the event rule 409. The rules log 415 may include additional information (not depicted) related to the event 1 402, such as a timestamp, or related to the event rule 409, such as trigger information.

At stage E, the event manager 103 forwards an event 2 404 in accordance with the action indicated by the event rule 409 to the alarm manager 405. The event manager 403 creates the event 2 404 based on the information contained in the event 1 402 and any additional information obtained from the event rule 409 or an event catalog (not depicted). Additionally, the event manager 403 tags the event 2 104 with the unique identifier determined at stage B. Although created for the event 1 402, the unique identifier is used to correlate all related events, generated events, or triggered rules. As a result, in FIG. 4, the unique identifier is tagged to events generated based on receipt of the event 1 402 and the event rule 409. The event 2 404 may also be logged in an events log.

At stage F, the alarm manager 405 determines whether the event 2 404 triggers any alarm rules in the alarm rule catalog 410. The alarm manager 405 determines whether the event 2 404 triggers any alarm rules in a manner similar to that of the alarm manager 405 as described at stage E of FIG. 1.

At stage G, in response to determining that the alarm rule 411 was triggered, the alarm manager 405 creates an instance of the alarm rule 411. The alarm manager 405 also writes an instance identifier for the instance of the alarm rule 411 to the rules log 415. As depicted in FIG. 4, the rules log 415 includes a record of the unique identifier received with the event 2 404 along with the rule identifier of the alarm rule 411 and the instance identifier ("am1") for the created instance of the alarm rule 411.

At stage H, the alarm manager 405 creates an alarm 406 in accordance with the action indicated by the alarm rule 111. When creating the alarm 406, the alarm manager 405 includes the unique identifier indicated by the event 2 404.

At stage I, after creating the alarm 406, the alarm manager 405 logs and forwards the alarm 406. The alarm manager 405 logs the alarm 406 to the alarm logs 416. The alarm manager 105 forwards the alarm 406 to the user interface 407.

At stage J, the user interface 407 displays the alarm 406. The user interface 407 may be part of network management software operating on a computer system or network host. The user interface 407 may display an alarm severity, a description of the alarm 406, etc. Additionally, using the unique identifier of the alarm 406, a system operating the user interface 407 may obtain information related to rules and events that resulted in generation of the alarm 406. For example, the system may be communicatively coupled to the rules log 415 and an events log (not depicted). The system may query the rules log 415 and events log using the unique identifier to obtain events and rules related to the alarm 406. The user interface 407 may then display obtained information related to events and rules that caused the alarm 406 to be generated. Additionally, the obtained information may be forwarded to root cause analysis software that may use the information to determine a root cause for an issue indicated by the alarm 406.

In FIG. 4, the alarm 406 is tagged with the unique identifier received with the event 2 104. In some instances, the alarm 406 may be tagged with multiple unique identifiers. For example, an alarm rule may indicate that an alarm should be created if both a first event and a second event are received. The alarm may be tagged with a unique identifier of the first event and a unique identifier of the second event.

Figure 5:
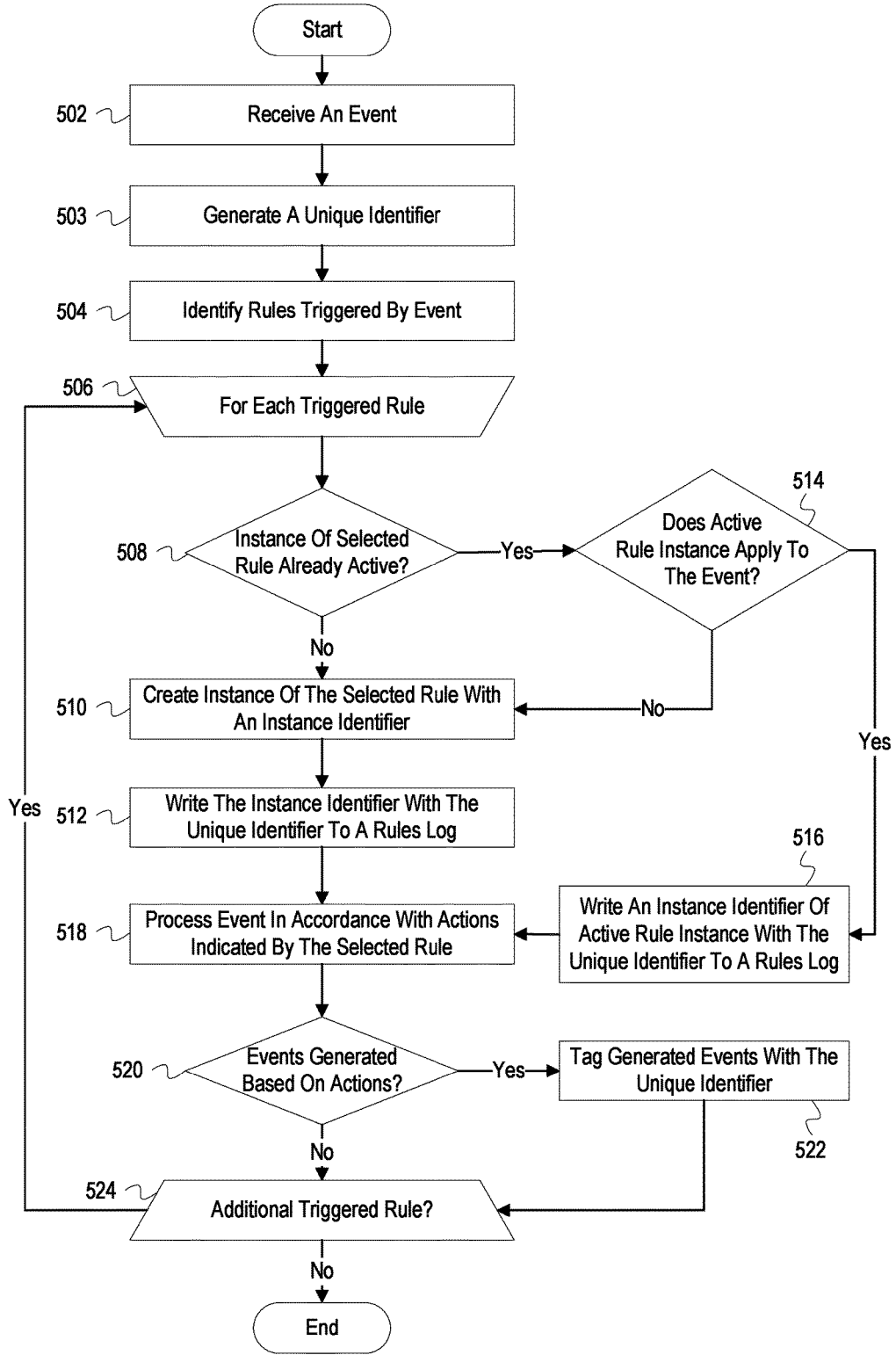
FIG. 5 depicts a flow diagram of example operations for tagging an event with a unique identifier.

FIG. 5 depicts a flow diagram of example operations for tagging an event with a unique identifier. The operations described in FIG. 5 are described as being performed by an event manager, such as the event manager 403 depicted in FIG. 4. The operations may also be performed by an alarm manager, such as the alarm manager 405 depicted in FIG. 4.

An event manager receives an event from a component (502). The event manager receives the event in a manner similar to that described at process block 202 of FIG. 2.

The event manager generates a unique identifier (503). The event manager may request the unique identifier from a module that manages identifiers, may generate a hash based on data from the event, may generate an identifier based on a configured namespace, etc. The event manager may also log the event along with the unique identifier.

The event manager identifies rules that were triggered by the event (504). The event manager identifies rules that were triggered by the event in a manner similar to that described at process block 204 of FIG. 2.

The event manager begins operations for each of the rules triggered by the event (506). The rule for which the event manager is currently performing operations is hereinafter referred to as "the selected rule."

The event manager determines whether an instance of the selected rule is already active (508). The event manager may search active rule instances with an identifier for the selected rule to determine whether the selected rule has any active instances. Active rule instances may be stored in memory or persistent storage of a system executing the event manager. Additionally, as described below, rule instance identifiers are stored in a rules log. The rules log may include additional information for the rule instance such as whether the rule instance is active.

After determining that there is at least one active instance of the selected rule, the event manager determines whether any of the active rule instances apply to the event (514). The event manager determines whether any of the active rule instances apply to the event in a manner similar to that described at process block 214 of FIG. 2. As described at process block 214, the event manager analyzes the selected rule to identify criteria or properties that control application of the rule. In the operations of FIG. 5, the event manager may also store application criteria in the rules log. The event manager may determine whether a rule instance applies to the event based on the criteria information in the rules log.

After determining that the active rule instance applies to the event, the event manager writes an instance identifier of the active rule instance with the unique identifier to the rules log (516). Since an active instance of the selected rule applies to the event, the event manager does not create another instance of the selected rule. Instead, the event manager writes the instance identifier of the active rule instance to the rules log along with the unique identifier. Each record of the rules log includes at least a unique identifier and a rule instance identifier. As a result, the rules log may be queried with a unique identifier to determine all rule instances associated with the unique identifier. Conversely, the rules log may be queried with instance identifiers to determine all unique identifiers associated with a rule instance.

After determining that there is not an active instance of the selected rule or after determining that the active rule instance does not apply to the event, the event manager creates an instance of the selected rule with an instance identifier (510). The event manager instantiates the selected rule in a manner similar to that described at process block 210 of FIG. 2.

The event manager tags writes the instance identifier of the selected rule instance with the unique identifier to the rules log (512). The event manager writes the instance identifier of the selected rule instance with the unique identifier to the rules log in a manner similar to that described above at process block 516.

The event manager processes the event in accordance with actions indicated by the selected rule (518). The event manager processes the event in accordance with actions indicated by the selected rule in a manner similar to that described at process block 218 of FIG. 2.

The event manager determines whether any events were generated based on the processing in accordance with the actions indicated by the selected rule (520).

If additional events were generated, the event manager tags the generated events with the unique identifier (522). The event manager may also log the events to an events log along with the unique identifier. The unique identifier is passed on to generated events so that the events may be traced back to the originally received event. As events with the unique identifier flow through and are processed by an event management system, the unique identifier may eventually be associated with an alarm. The unique identifier may then be used to identify rule instances and events that resulted in the alarm by querying the rules log and an events log.

If additional events were not generated or after generated events were tagged, the event manager determines whether there is an additional rule triggered by the event (524). If there is an additional triggered rule, the event manager selects the next triggered rule (506). If all rules have been processed, the operations end.

Figure 6:
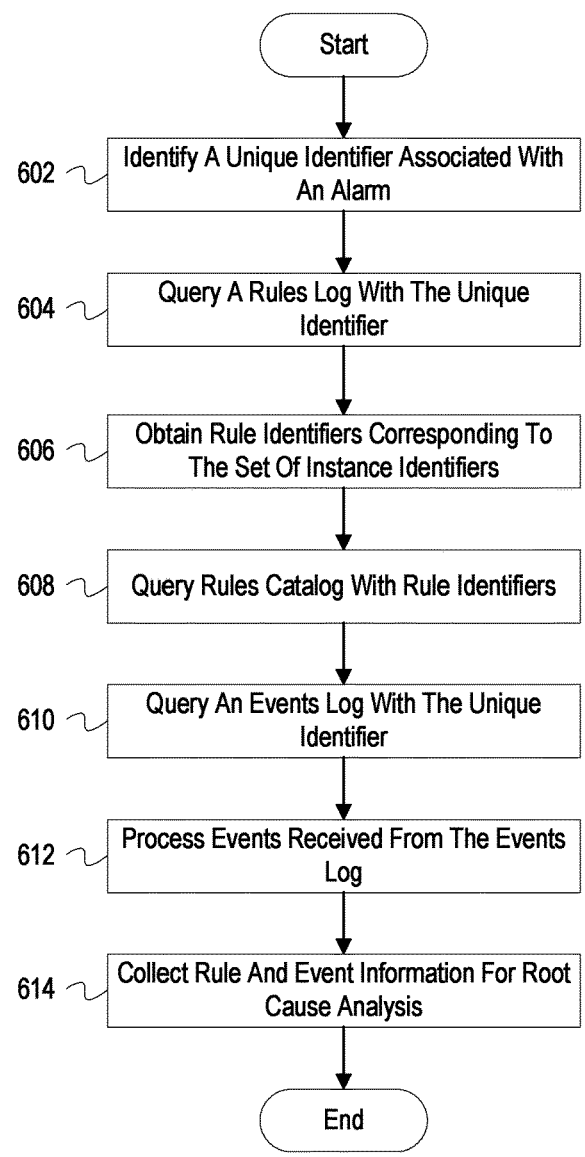
FIG. 6 depicts a flow diagram of example operations for using a unique identifier to trace from an alarm to contributory events and rules.

FIG. 6 depicts a flow diagram of example operations for using a unique identifier to trace from an alarm to contributory events and rules. The operations described in FIG. 6 are described as being performed by a network manager that may be a module in an event management system or a module in a network management and monitoring system that displays and analyzes alarms. The operations may also be performed by a module of a root cause analysis system that attempts to determine the cause of issues indicated by the alarms.

A network manager identifies a unique identifier associated with an alarm (602). As described above in FIG. 4, an alarm generated by an event management system includes a unique identifier. The unique identifier may be stored in metadata of the alarm or as part of the alarm data structure. The network manager reads the unique identifier from the alarm.

The network manager queries a rules log with the unique identifier (604). The rules log is similar to the rules log 415 described in FIG. 4. The rules log includes rule instance identifiers that are associated with a unique identifier. In response to the query by the network manager, the rules log returns instance identifiers associated with the unique identifier. Some implementations may include multiple rules logs, such as one associated with an event manager and one associated with an alarm manager. As a result, the network manager may query multiple data sources with the unique identifier. Additionally, the instance identifiers may be associated with additional unique identifiers. Multiple queries or a chain of queries may be executed with the additional unique identifiers in order to retrieve or trace back to all rule instance identifiers associated with the unique identifier.

The network manager obtains rule identifiers corresponding to the set of instance identifiers (606). When a rule is instantiated, an event management system creates an instance identifier and stores the instance identifier along with an identifier for the rule. The event management system may store the identifiers together in memory, persistent storage, a database, etc. Using the set of instance identifiers, the network manager may obtain the rule identifier from the storage location of the identifiers.

The network manager queries a rules catalog with the rule identifiers (608). The rules catalog may be a rules catalog such as the event rule catalog 408 or the alarm rule catalog 410 as described in FIG. 4. The network manager queries the rules catalog to obtain information related to a rule corresponding to the rule identifiers.

The network manager queries an events log with the unique identifier (610). As described in FIG. 4, an event management system tags an event with a unique identifier upon receipt of the event. The event manager also tags events generated based on the received event with the unique identifier. The tagged events are written to an events log. As a result, the events log contains events along with corresponding unique identifiers. In response to a query with the unique identifier by the network manager, the events log returns events that are associated with the unique identifier. Some implementations may include multiple events logs, such as one associated with an event manager and one associated with an alarm manager. As a result, the network manager may query multiple data sources with the unique identifier. Furthermore, if any additional unique identifiers were identified at process block 604, the network manager may perform more queries on the events log with the additional unique identifiers.

The network manager processes events received from the events log (612). The network manager may process the received events by populating an array with the events, sorting the events based on corresponding timestamps, organizing the events based on event types or other event properties, etc. Furthermore, the network manager may identify additional unique identifiers in the received events by comparing unique identifiers associated with the received events to the unique identifier. The network manager may perform additional queries with the additional unique identifiers in a manner similar to that described at process block 610. The network manager may then similarly process any additional events received as a result of the queries. Therefore, multiple queries or a chain of queries may be executed in order to retrieve or trace back to all events associated with the selected instance identifier.

The network manager collects rule and event information for root cause analysis (614). The network manager collects the rule and event information for root cause analysis in a manner similar to that described at block 316 of FIG. 3.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 208 and 214 of FIG. 2 and blocks 508 and 514 of FIG. 5 can be performed in parallel or concurrently. Additionally, the operations depicted in blocks 410 and 412 of FIG. 4 and blocks 606 and 608 of FIG. 6 may not be performed. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

Some operations above iterate through sets of items, such as triggered rules. In some implementations, triggered rules may be iterated according to an ordering of rule identifiers, an indicator of rule importance, etc. Also, the number of iterations for loop operations may vary. Different techniques for processing rules and events may require fewer iterations or more iterations. For example, rules may be processed in parallel, reducing the number of iterations. Additionally, a loop may not iterate for each triggered rule. For example, some triggered rules may be ignored based on an alarm already being generated for a particular event.

The variations described above do not encompass all possible variations, implementations, or embodiments of the present disclosure. Other variations, modifications, additions, and improvements are possible.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium. A machine readable storage medium does not include transitory, propagating signals.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 7:
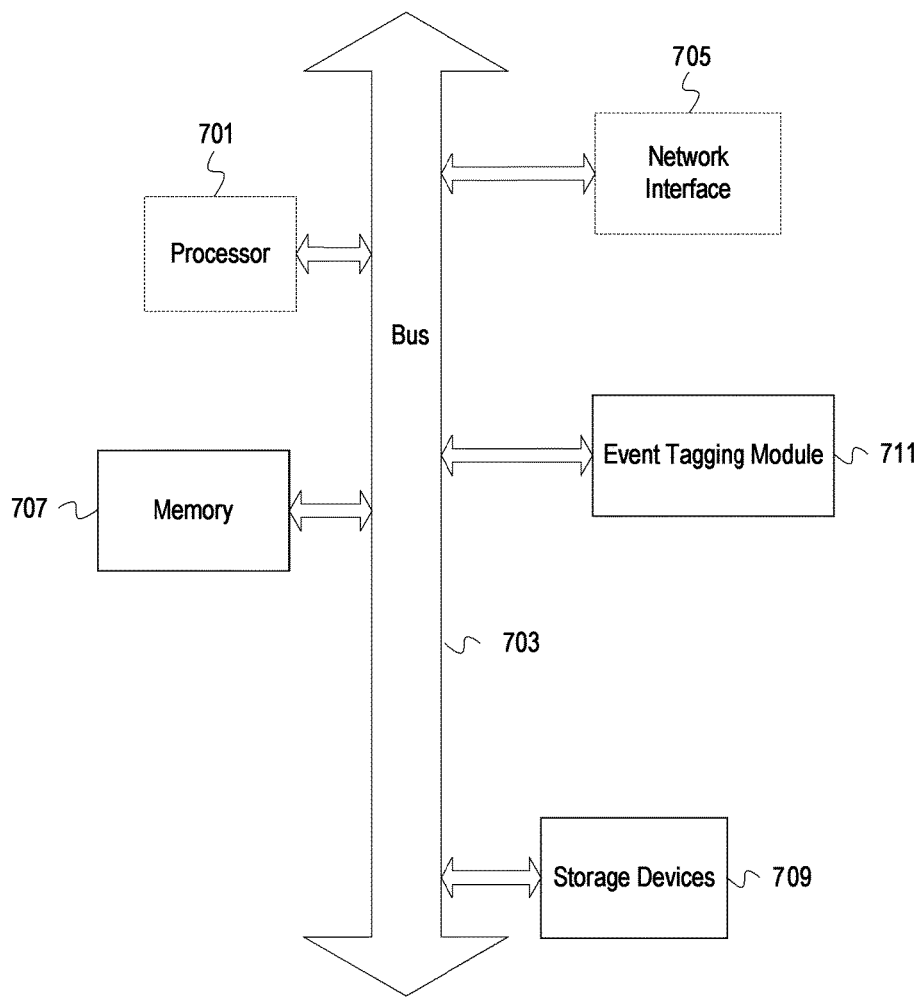
FIG. 7 depicts an example computer system with an event tagging module.

FIG. 7 depicts an example computer system with an event tagging module. The computer system includes a processor 701 (possibly including multiple processors, multiple cores, multiple nodes, and/or implementing multi-threading, etc.). The computer system includes memory 707. The memory 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes storage devices 709. The storage devices 709 may be local or remote storage (e.g., a hard disk or hard disk array, a diskette, an optical storage device, a magnetic storage device, Network Attached Storage (NAS), Storage Area Network (SAN)) or any one or more of the above already described possible realizations of machine-readable media. The computer system also includes a bus 703 (e.g., PCI, ISA, PCI-Express, HyperTransport® bus, InfiniBand® bus, NuBus, etc.) and a network interface 705 (e.g., a Fiber Channel interface, an Ethernet interface, an internet small computer system interface, SONET interface, wireless interface, etc.). The system also includes an event tagging module 711. The event tagging module 711 tags events with rule instance identifiers to enable event and rule tracing for a generated alarm. Alternatively, the event tagging module 711 may tag events with a unique identifier and log associated rule instances along with the unique identifier. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

While the aspects of the disclosure are described with reference to various implementations and exploitations, it will be understood that these aspects are illustrative and that the scope of the claims is not limited to them. In general, techniques for enabling event and rule tracing for a generated alarm as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

What is claimed is:

1. A method comprising:
identifying a first rule applicable to a first event indication, wherein the first event indication was generated by an agent at a first component;
creating a first instance of the first rule which includes first state data;
tagging and storing the first event indication with an identifier for the first instance of the first rule;
updating the first state data based, at least in part, on the first event indication;
based on receipt of a second event indication from the agent of the first component, determining that the first rule is applicable to the second event indication;
based on determining that the first instance of the first rule already exists,
tagging and storing the second event indication with the identifier for the first instance of the first rule; and
updating the first state data based, at least in part, on the second event indication;
generating a third event indication based, at least in part, on the first state data indicating that a condition for the first instance of the first rule has been satisfied;
determining that a first alarm is to be generated based, at least in part, on the third event indication;
generating the first alarm with the identifier for the first instance of the first rule; and
based on receipt of a request for events contributing to the first alarm, retrieving at least the first and second event indications based, at least in part, on the identifier for the first instance of the first rule.

2. The method of claim 1, wherein determining that the first alarm is to be generated comprises applying a second rule to the third event indication and determining that a condition of the second rule has been satisfied.

3. The method of claim 2 further comprising tagging and storing the third event indication in an event log with an identifier for a first instance of the second rule.

4. The method of claim 1, wherein updating the first state data based, at least in part, on the first event indication comprises incrementing a counter in the first state data which indicates a number of event indications to which the first instance of the first rule has been applied.

5. The method of claim 4, wherein generating the third event indication based, at least in part, on the first state data indicating that the condition for the first instance of the first rule has been satisfied comprises:
determining that the condition is satisfied when the first instance of the first rule has been applied to two event indications; and
determining that the counter in the first state data indicates that the first instance of the first rule has been applied to two event indications.

6. The method of claim 1, wherein identifying a first rule applicable to a first event indication comprises:
determining an event type of the first event indication;
querying a rules catalog with the event type; and
based on determining that applicability of the first rule is conditioned on a threshold, determining whether data in the first event indication satisfies the threshold;
wherein creating the first instance of the first rule is based on determining that the data in the first event indication satisfies the threshold.

7. The method of claim 1, based on receipt of a request for events contributing to the first alarm, providing the first state data related to satisfying the condition for the first instance of the first rule.

8. The method of claim 1 further comprising:
based on receipt of a fourth event indication,
determining that the first rule is applicable to the fourth event indication; and
based on determining that the first instance of the first rule is associated with the first alarm,
creating a second instance of the first rule; and
tagging and storing the fourth event indication with an identifier for the second instance of the first rule.

9. One or more non-transitory machine-readable storage media having program code stored therein, the program code to:
identify a first rule applicable to a first event indication, wherein the first event indication was generated by an agent at a first component;
create a first instance of the first rule which includes first state data;
tag and store the first event indication with an identifier for the first instance of the first rule;
update the first state data based, at least in part, on the first event indication;
based on receipt of a second event indication from the agent of the first component, determine that the first rule is applicable to the second event indication;
based on a determination that the first instance of the first rule already exists,
tag and store the second event indication with the identifier for the first instance of the first rule; and
update the first state data based, at least in part, on the second event indication;
generate a third event indication based, at least in part, on the first state data indicating that a condition for the first instance of the first rule has been satisfied;
determine that a first alarm is to be generated based, at least in part, on the third event indication;
generate the first alarm with the identifier for the first instance of the first rule; and
based on receipt of a request for events contributing to the first alarm, retrieve at least the first and second event indications based, at least in part, on the identifier for the first instance of the first rule.

10. The machine-readable storage media of claim 9, wherein the program code to determine that the first alarm is to be generated comprises program code to apply a second rule to the third event indication and determine that a condition of the second rule has been satisfied.

11. The machine-readable storage media of claim 10 further comprising program code to tag and store the third event indication in an event log with an identifier for a first instance of the second rule.

12. The machine-readable storage media of claim 9, wherein the program code to update the first state data based, at least in part, on the first event indication comprises program code to increment a counter in the first state data which indicates a number of event indications to which the first instance of the first rule has been applied.

13. The machine-readable storage media of claim 12, wherein the program code to generate the third event indication based, at least in part, on the first state data indicating that the condition for the first instance of the first rule has been satisfied comprises program code to:
determine that the condition is satisfied when the first instance of the first rule has been applied to two event indications; and determine that the counter in the first state data indicates that the first instance of the first rule has been applied to two event indications.

14. An apparatus comprising:
a processor; and
a machine-readable medium having program code executable by the processor to cause the apparatus to,
identify a first rule applicable to a first event indication, wherein the first event indication was generated by an agent at a first component;
create a first instance of the first rule which includes first state data;
tag and store the first event indication with an identifier for the first instance of the first rule;
update the first state data based, at least in part, on the first event indication;
based on receipt of a second event indication from the agent of the first component, determine that the first rule is applicable to the second event indication;
based on a determination that the first instance of the first rule already exists,
tag and store the second event indication with the identifier for the first instance of the first rule; and
update the first state data based, at least in part, on the second event indication;
generate a third event indication based, at least in part, on the first state data indicating that a condition for the first instance of the first rule has been satisfied;
determine that a first alarm is to be generated based, at least in part, on the third event indication;
generate the first alarm with the identifier for the first instance of the first rule; and
based on receipt of a request for events contributing to the first alarm, retrieve at least the first and second event indications based, at least in part, on the identifier for the first instance of the first rule.

15. The apparatus of claim 14, wherein the program code executable by the processor to cause the apparatus to determine that the first alarm is to be generated comprises program code executable by the processor to cause the apparatus to apply a second rule to the third event indication and determine that a condition of the second rule has been satisfied.

16. The apparatus of claim 15 further comprising program code executable by the processor to cause the apparatus to tag and store the third event indication in an event log with an identifier for a first instance of the second rule.

17. The apparatus of claim 14, wherein the program code executable by the processor to cause the apparatus to update the first state data based, at least in part, on the first event indication comprises program code executable by the processor to cause the apparatus to increment a counter in the first state data which indicates a number of event indications to which the first instance of the first rule has been applied.

18. The apparatus of claim 17, wherein the program code executable by the processor to cause the apparatus to generate the third event indication based, at least in part, on the first state data indicating that the condition for the first instance of the first rule has been satisfied comprises program code executable by the processor to cause the apparatus to:
determine that the condition is satisfied when the first instance of the first rule has been applied to two event indications; and
determine that the counter in the first state data indicates that the first instance of the first rule has been applied to two event indications.

19. The apparatus of claim 14, wherein the program code executable by the processor to cause the apparatus to identify a first rule applicable to a first event indication comprises program code executable by the processor to cause the apparatus to:
determine an event type of the first event indication;
query a rules catalog with the event type; and
based on a determination that applicability of the first rule is conditioned on a threshold, determine whether data in the first event indication satisfies the threshold;
wherein the program code executable by the processor to cause the apparatus to create the first instance of the first rule is based on a determination that the data in the first event indication satisfies the threshold.

20. The apparatus of claim 14 further comprising program code executable by the processor to cause the apparatus to:
based on receipt of a fourth event indication,
determine that the first rule is applicable to the fourth event indication; and
based on a determination that the first instance of the first rule is associated with the first alarm,
create a second instance of the first rule; and
tag and store the fourth event indication with an identifier for the second instance of the first rule.

* * * * *